(12) United States Patent
Nakagawa et al.

(10) Patent No.: US 8,340,184 B2
(45) Date of Patent: *Dec. 25, 2012

(54) MOTION VECTOR ENCODING DEVICE AND DECODING DEVICE

(75) Inventors: Akira Nakagawa, Kanagawa (JP); Taizo Anan, Kanagawa (JP); Eishi Morimatsu, Kanagawa (JP); Takashi Itoh, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 1295 days.

This patent is subject to a terminal disclaimer.

(21) Appl. No.: 11/686,049

(22) Filed: Mar. 14, 2007

(65) Prior Publication Data

US 2007/0153902 A1 Jul. 5, 2007

Related U.S. Application Data

(63) Continuation of application No. 09/348,165, filed on Jul. 7, 1999, now Pat. No. 7,272,182.

(30) Foreign Application Priority Data

Oct. 29, 1998 (JP) .................................... 10-308942

(51) Int. Cl.
H04N 7/12 (2006.01)
(52) U.S. Cl. .......... 375/240.16; 375/240.12; 375/240.25
(58) Field of Classification Search .................. 375/240, 375/240.01, 240.03, 240.12, 240.16, 240.25
See application file for complete search history.

(56) References Cited

U.S. PATENT DOCUMENTS

| 4,951,140 A | 8/1990 | Ueno et al. ................. 348/413.1 |
| 5,198,901 A | 3/1993 | Lynch ....................... 375/240.14 |
| 5,428,396 A * | 6/1995 | Yagasaki et al. ......... 375/240.16 |
| 5,574,504 A | 11/1996 | Yagasaki et al. ......... 375/240.13 |
| 5,579,050 A | 11/1996 | Jung ........................ 375/240.14 |
| 5,594,813 A | 1/1997 | Fandrianto et al. |
| 5,646,689 A | 7/1997 | Ostermann |
| 5,717,441 A | 2/1998 | Serizawa et al. ............. 345/236 |
| 5,717,462 A | 2/1998 | Hayashi ................... 375/240.13 |
| 6,271,885 B2 | 8/2001 | Sugiyama .................. 348/402.1 |
| 6,339,616 B1 * | 1/2002 | Kovalev .................... 375/240.16 |
| 7,272,182 B1 | 9/2007 | Nakagawa et al. |
| 7,310,372 B2 | 12/2007 | Nakagawa et al. |

FOREIGN PATENT DOCUMENTS

| JP | 2-131690 | 5/1990 |
| JP | 4-299688 | 10/1992 |
| JP | 2000-13799 | 1/2000 |

OTHER PUBLICATIONS

Notice of Allowance mailed Dec. 10, 2010, in U.S. Appl. No. 11/651,014.

(Continued)

Primary Examiner — Allen Wong
(74) Attorney, Agent, or Firm — Staas & Halsey LLP

(57) ABSTRACT

A prediction error generating unit generates a predictive vector from the motion vectors of a plurality of adjacent blocks, and obtains a difference from a target vector. A plurality of variable-length coding units respectively encode the output of the prediction error generating unit with different encoding methods. A determining unit estimates the accuracy of the predictive vector generated by the prediction error generating unit based on the degrees of non-uniformity of the motion vectors of the plurality of adjacent blocks. A selecting unit selects one of the encoding results obtained by the plurality of variable-length coding units.

5 Claims, 16 Drawing Sheets

OTHER PUBLICATIONS

Issue Notification mailed Aug. 29, 2007 in U.S. Appl. No. 09/348,165.
Office Action mailed Aug. 1, 2007 in U.S. Appl. No. 09/348,165.
Notice of Allowance and Fee(s) Due mailed May 15, 2007 in U.S. Appl. No. 09/348,165.
Office Action mailed Mar. 14, 2007 in U.S. Appl. No. 09/348,165.
Office Action mailed Sep. 1, 2006 in U.S. Appl. No. 09/348,165.
Office Action mailed Dec. 28, 2005 in U.S. Appl. No. 09/348,165.
Decision on Petition mailed Oct. 19, 2005 in U.S. Appl. No. 09/348,165.
Advisory Action mailed Jun. 17, 2005 in U.S. Appl. No. 09/348,165.
Office Action mailed Nov. 18, 2004 in U.S. Appl. No. 09/348,165.
Office Action mailed Jan. 7, 2004 in U.S. Appl. No. 09/348,165.
Office Action mailed May 5, 2003 in U.S. Appl. No. 09/348,165.
Issue Notification mailed Nov. 28, 2007 in U.S. Appl. No. 10/375,127.
Notice of Allowance and Fee(s) Due Sep. 25, 2007 in U.S. Appl. No. 10/375,127.
Office Action mailed May 25, 2007 in U.S. Appl. No. 10/375,127.
Office Action mailed Nov. 2, 2006 in U.S. Appl. No. 10/375,127.
Office Action mailed Feb. 14, 2006 in U.S. Appl. No. 10/375,127.
Notice of Allowance and Fee(s) Due Dec. 10, 2010 in U.S. Appl. No. 11/651,014.
Office Action mailed Jul. 2, 2010 in U.S. Appl. No. 11/651,014.
Office Action mailed Mar. 17, 2009 in U.S. Appl. No. 11/651,014.
Office Action mailed Jun. 18, 2008 in U.S. Appl. No. 11/651,014.
Japanese Patent Office Notice of Grounds of Rejection mailed Oct. 3, 2006 for corresponding Japanese Patent Application No. 10-308942.
U.S. Appl. No. 12/470,095, filed May 21, 2009, Akira Nakagawa et al., Fujitsu Limited.
Office Action mailed Jul. 2, 2010, in U.S. Appl. No. 11/651,014.
Sukeichi Miki, "All about MPEG-4", Kogyo Chosakai Co., Ltd., Sep. 30, 1998, pp. 45-46.
Japanese Patent Office Action, mailed Apr. 24, 2007 and issued in corresponding Japanese Patent Application No. 10-308942.
U.S. Appl. No. 09/348,165, filed Jul. 7, 1999, Akira Nakagawa, et al., Fujitsu Limited.
U.S. Appl. No. 10/375,127, filed Feb. 28, 2003, Akira Nakagawa, et al., Fujitsu Limited.
U.S. Appl. No. 11/651,014, filed Jan. 9, 2007, Akira Nakagawa, et al., Fujitsu Limited.
U.S. Appl. No. 11/744,432, filed May 4, 2007, Akira Nakagawa, et al., Fujitsu Limited.
ITU-T, Line Transmission of Non-Telephone Signals, Video Codec for Audiovisual Services at p. x 64 kbits, ITU-T Recommendation H.261 (Mar. 1993).
Gary J. Sullivan, Ph.D., International Telecommunication Union, Overview of International Video Coding Standards (preceding H.264/AVC), ITU-T VICA Workshop, Jul. 22-23, 2005, ITU Headquarter, Geneva.
Office Action mailed Jun. 17, 2011 in U.S. Appl. No. 12/470,095.
Office Action mailed Jun. 30, 2011 in U.S. Appl. No. 12/952,684.
U.S. Appl. No. 12/952,684, filed Nov. 23, 2010, Akira Nakagawa et al., Fujitsu Limited.
Office Action mailed Dec. 19, 2011, in U.S. Appl. No. 11/744,432.
Office Action mailed May 27, 2011, in U.S. Appl. No. 11/744,432.
Notice of Allowance mailed Jan. 17, 2012, in U.S. Appl. No. 12/470,095.
Office Action mailed Feb. 9, 2012, in U.S. Appl. No. 12/952,684.
Notice of Allowance mailed Oct. 1, 2012 in co-pending U.S. Appl. No. 11/744,432.

* cited by examiner

| DIFFERENCE | H.263 MVD |
|---|---|
| -16.0 | 0000000000101 |
| -15.5 | 0000000000111 |
| -15.0 | 000000000101 |
| -14.5 | 000000000111 |
| -14.0 | 000000001001 |
| -13.5 | 000000001011 |
| -13.0 | 000000001101 |
| -12.5 | 000000001111 |
| -12.0 | 00000001001 |
| -11.5 | 00000001011 |
| -11.0 | 00000001101 |
| -10.5 | 00000001111 |
| -10.0 | 00000010001 |
| -9.5 | 00000010011 |
| -9.0 | 00000010101 |
| -8.5 | 00000010111 |
| -8.0 | 00000011001 |
| -7.5 | 00000011011 |
| -7.0 | 00000011101 |
| -6.5 | 00000011111 |
| -6.0 | 00000100001 |
| -5.5 | 00000100011 |
| -5.0 | 0000010011 |
| -4.5 | 0000010101 |
| -4.0 | 0000010111 |
| -3.5 | 00000111 |
| -3.0 | 00001001 |
| -2.5 | 00001011 |
| -2.0 | 0000111 |
| -1.5 | 00011 |
| -1.0 | 0011 |
| -0.5 | 011 |
| -0.0 | 1 |

| 0.5 | 010 |
|---|---|
| 1.0 | 0010 |
| 1.5 | 00010 |
| 2.0 | 0000110 |
| 2.5 | 00001010 |
| 3.0 | 00001000 |
| 3.5 | 00000110 |
| 4.0 | 0000010110 |
| 4.5 | 0000010100 |
| 5.0 | 0000010010 |
| 5.5 | 00000100010 |
| 6.0 | 00000100000 |
| 6.5 | 00000011110 |
| 7.0 | 00000011100 |
| 7.5 | 00000011010 |
| 8.0 | 00000011000 |
| 8.5 | 00000010110 |
| 9.0 | 00000010100 |
| 9.5 | 00000010010 |
| 10.0 | 00000010000 |
| 10.5 | 00000001110 |
| 11.0 | 00000001100 |
| 11.5 | 00000001010 |
| 12.0 | 000000001000 |
| 12.5 | 000000001110 |
| 13.0 | 000000001100 |
| 13.5 | 000000001010 |
| 14.0 | 000000001000 |
| 14.5 | 000000000110 |
| 15.0 | 000000000100 |
| 15.5 | 0000000000110 |

F I G. 3

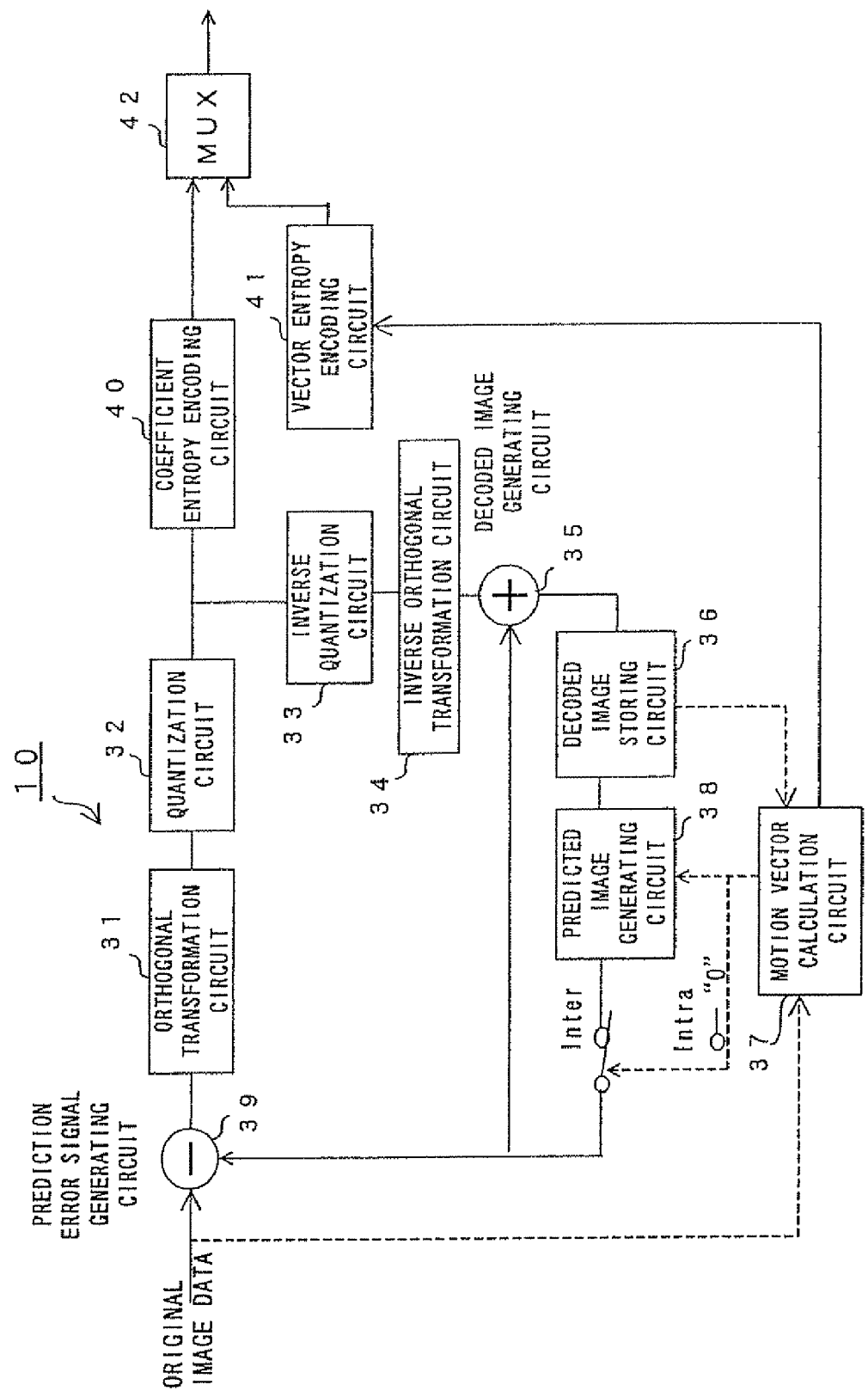
F I G. 7

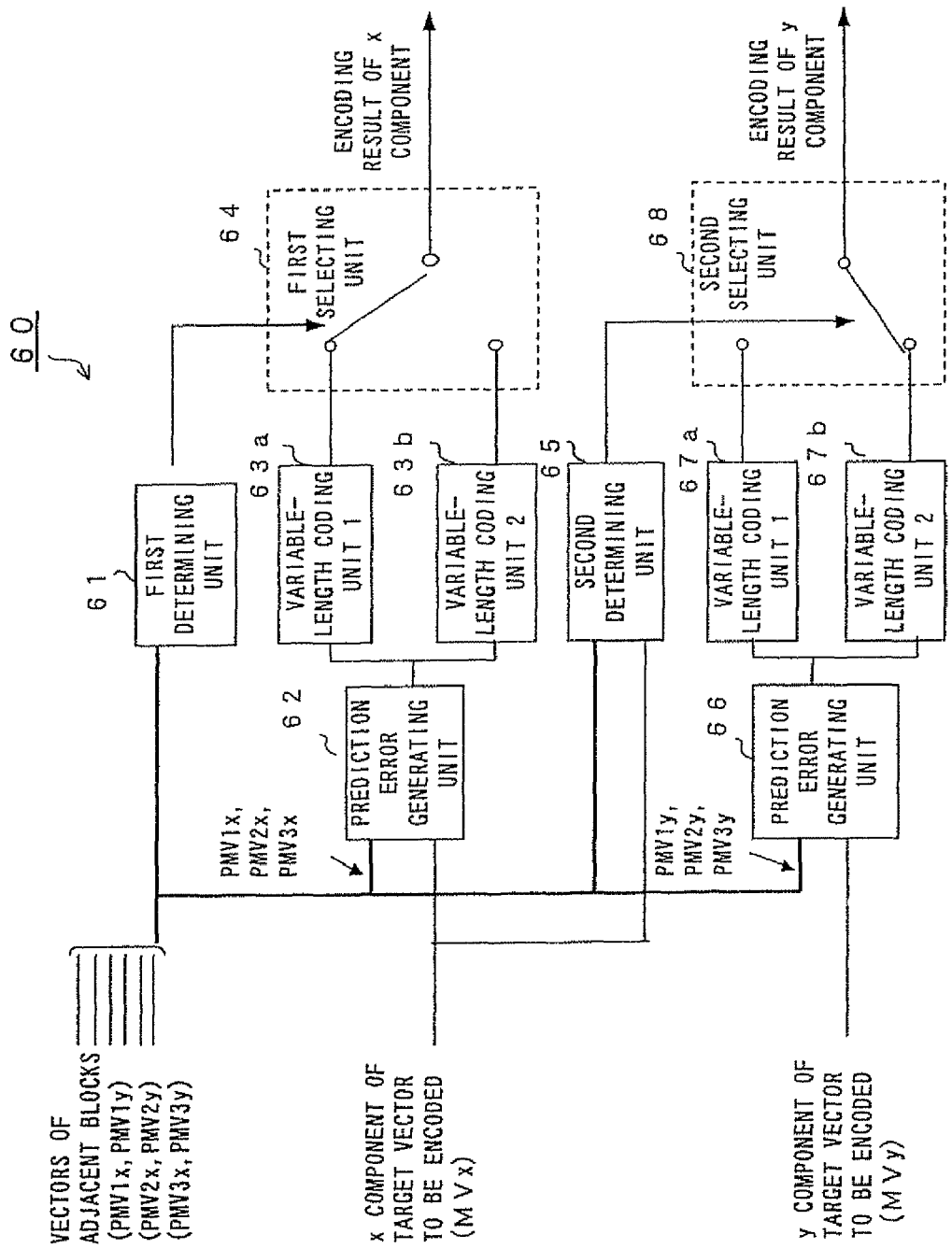
F I G. 9

| PREDICTION ERROR | VARIABLE-LENGTH CODES 1 | VARIABLE-LENGTH CODES 2 |
|---|---|---|
| -16.0 | 0000000000101 | 00000001 |
| -15.5 | 0000000000111 | 00000011 |
| -15.0 | 000000000101 | 0000011 |
| -14.5 | 000000000111 | 0000111 |
| -14.0 | 000000001001 | 1101111 |
| -13.5 | 000000001011 | 1100011 |
| -13.0 | 000000001101 | 0000111 |
| -12.5 | 000000001111 | 1000011 |
| -12.0 | 00000001001 | 1000001 |
| -11.5 | 00000001011 | 1101011 |
| -11.0 | 00000001101 | 0000101 |
| -10.5 | 00000001111 | 1101001 |
| -10.0 | 00000010001 | 1100101 |
| -9.5 | 00000010011 | 1100001 |
| -9.0 | 00000010101 | 1101101 |
| -8.5 | 00000010111 | 0100001 |
| -8.0 | 00000011001 | 0001001 |
| -7.5 | 00000011011 | 0100011 |
| -7.0 | 00000011101 | 0001011 |
| -6.5 | 00000011111 | 0101011 |
| -6.0 | 00000100001 | 0101001 |
| -5.5 | 00000100011 | 101011 |
| -5.0 | 0000010011 | 101001 |
| -4.5 | 0000010101 | 000111 |
| -4.0 | 0000010111 | 100111 |
| -3.5 | 00000111 | 010111 |
| -3.0 | 00001001 | 010011 |
| -2.5 | 00010011 | 10111 |
| -2.0 | 0000111 | 10011 |
| -1.5 | 00011 | 01101 |
| -1.0 | 0011 | 01111 |
| -0.5 | 011 | 1111 |
| -0.0 | 1 | 001 |

| | | |
|---|---|---|
| 0.5 | 010 | 1110 |
| 1.0 | 0010 | 01110 |
| 1.5 | 00010 | 01100 |
| 2.0 | 0000110 | 10010 |
| 2.5 | 00001010 | 10110 |
| 3.0 | 00001000 | 010010 |
| 3.5 | 00000110 | 010110 |
| 4.0 | 0000010110 | 100010 |
| 4.5 | 0000010100 | 000110 |
| 5.0 | 0000010010 | 101000 |
| 5.5 | 00000100010 | 101010 |
| 6.0 | 00000100000 | 0101000 |
| 6.5 | 00000011110 | 0101010 |
| 7.0 | 00000011100 | 0001010 |
| 7.5 | 00000011010 | 0100010 |
| 8.0 | 00000011000 | 0001000 |
| 8.5 | 00000010110 | 0100000 |
| 9.0 | 00000010100 | 1101100 |
| 9.5 | 00000010010 | 1100000 |
| 10.0 | 00000010000 | 1100100 |
| 10.5 | 00000001110 | 1101000 |
| 11.0 | 00000001100 | 0000100 |
| 11.5 | 00000001010 | 1101010 |
| 12.0 | 00000001000 | 1000000 |
| 12.5 | 00000001110 | 1000010 |
| 13.0 | 00000001100 | 1000110 |
| 13.5 | 00000001010 | 1100010 |
| 14.0 | 00000001000 | 1101110 |
| 14.5 | 00000000110 | 1100110 |
| 15.0 | 00000000100 | 0000010 |
| 15.5 | 000000000110 | 00000010 |

F I G. 1 1

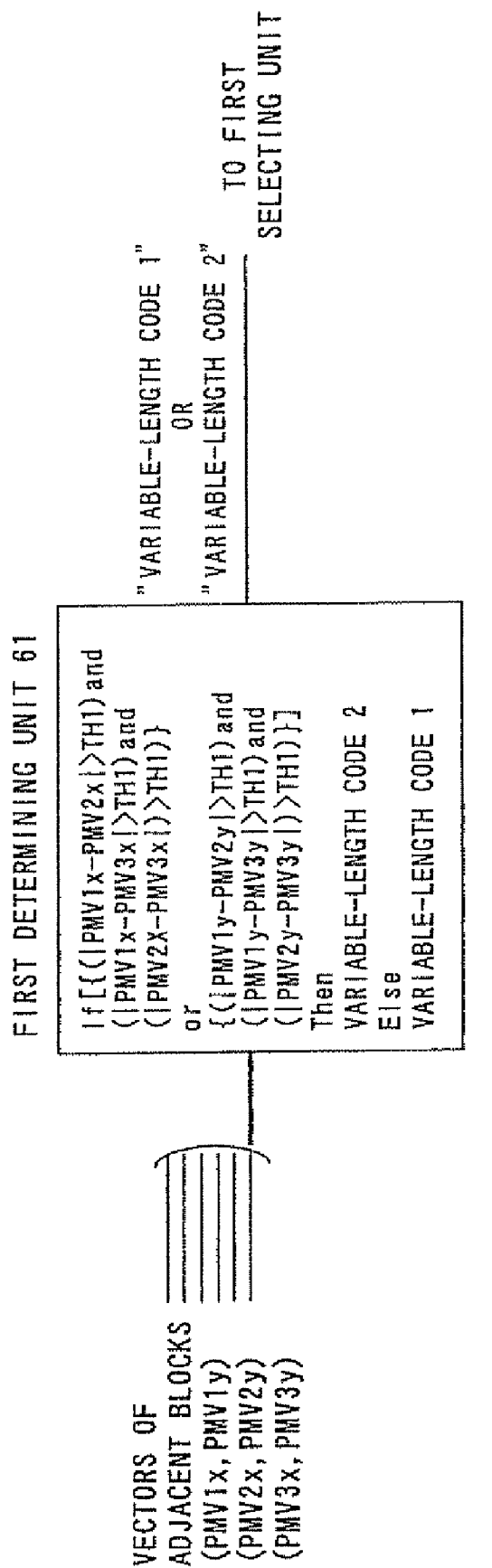
F I G. 12

F I G. 13

SECOND DETERMINING UNIT 65

```
If [[[(|PMV1x-PMV2x|)>TH1) and
    (|PMV1x-PMV3x|)>TH1) and
    (|PMV2x-PMV3x|)>TH1)]
or
[((|PMV1y-PMV2y|)>TH1) and
    ((|PMV1y-PMV3y|)>TH1) and
    (|PMV2y-PMV3y|)>TH1)]]
or
(|MVx-
Median(PMV1x, PMV2x, PMV3x)|>TH2)]
Then
    VARIABLE-LENGTH CODE 2
Else
    VARIABLE-LENGTH CODE 1
```

SAME DETERMINATION CRITERIA AS THOSE OF FIRST DETERMINING UNIT 61

"VARIABLE-LENGTH CODE 1"
OR
"VARIABLE-LENGTH CODE 2"

TO SECOND SELECTING UNIT 68

VECTORS OF ADJACENT BLOCKS
(PMV1x, PMV1y)
(PMV2x, PMV2y)
(PMV3x, PMV3y)

x COMPONENT OF TARGET VECTOR TO BE ENCODED (MVx)

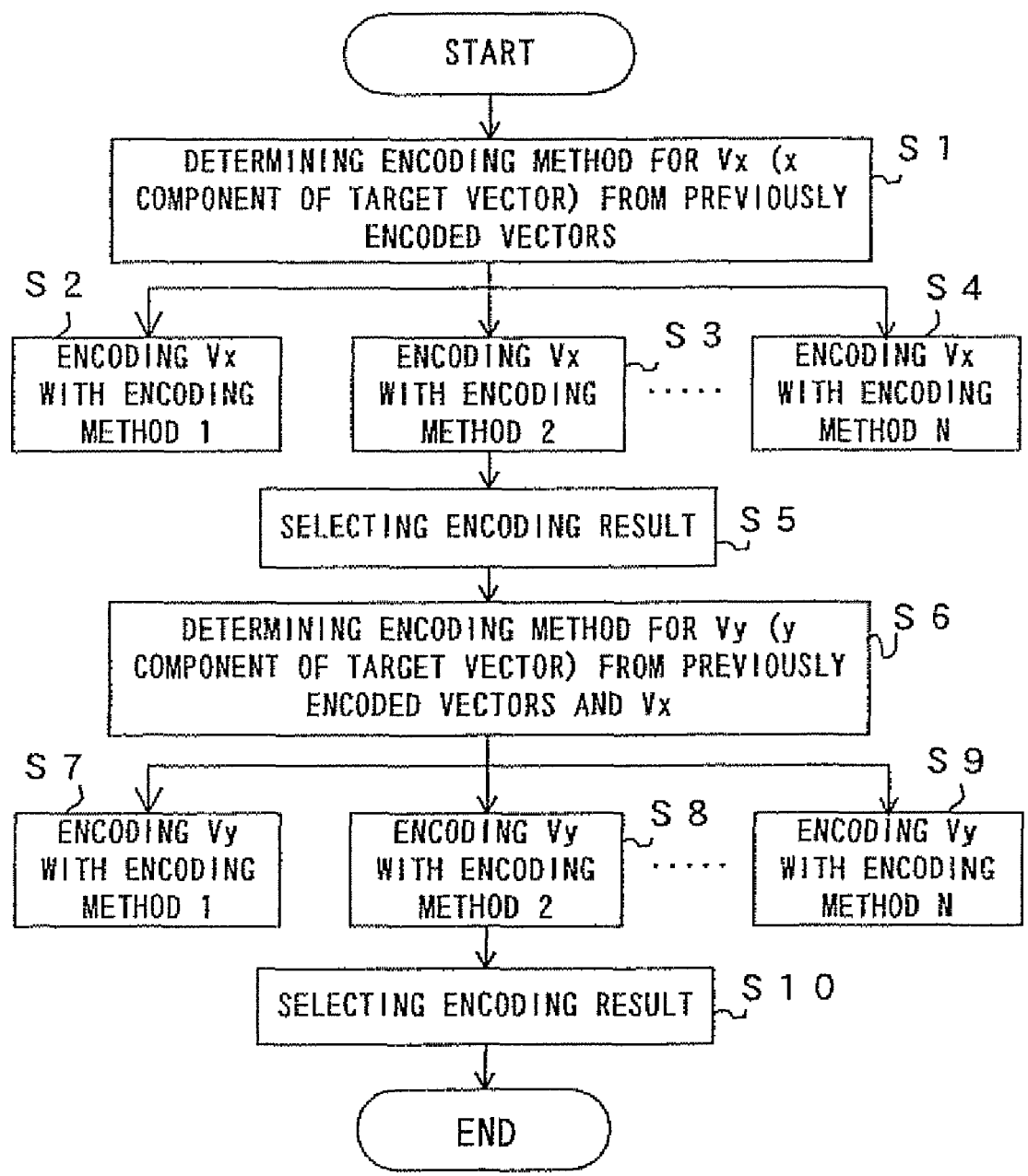
F I G. 1 4

MOTION VECTOR ENCODING DEVICE AND DECODING DEVICE

This application is a continuation of Ser. No. 09/348,165, filed Jul. 7, 1999, which issued as U.S. Pat. No. 7,272,182 on Sep. 18, 2007, the disclosure of which is incorporated herein by reference.

BACKGROUND OF THE INVENTION

1. Field of the Invention

The present invention relates to an encoding device and a decoding device for motion vector data of a moving image.

2. Description of the Related Art

Since an amount of data of a moving image is normally large, the data is encoded with a high efficiency coding when being transferred from a transmitting device to a receiving device or when being stored in a storage device. Here, the high efficiency coding is an encoding process for converting a data sequence into a different data sequence, and for compressing its data amount.

As a high efficiency coding method for moving image data, an interframe predictive coding is known. This coding method takes advantage of the nature that the degree of correlation of moving image data is high in a time direction. Namely, the degree of similarity between frame data of moving image data at certain timing and that at the next timing is normally high in many cases. Therefore, the interframe predictive coding utilizes this nature. For example, in a data transmission system using the interframe predictive coding, a transmitting device generates motion vector data which represents a motion from an image in a preceding frame to an image in a target frame, and differentce data (predictive error) between a predicted image in the target frame, which is generated from the image in the preceding frame by using the motion vector data, and an image in the target frame. The transmitting device then outputs the motion vector data and the difference data to a receiving device. The receiving device reproduces the image in the target frame from the received motion vector data and difference data.

If the degree of correlation between the target and preceding frames is high in the above described encoding process, the amounts of information of the motion vector data and the difference data become small.

The above described interframe predictive coding is employed by the standard methods such as the ITU-T H.261, ITU-T H.263, ISO/IEC MPEG-1, ISO/IEC MPEG-2, etc. Additionally, these standard methods utilize predictive coding as a method for encoding motion vector data. Hereinafter, a method for encoding motion vector data will be explained by citing the ITU-T H.263 as an example.

With a predictive coding, an image in each frame is partitioned into a plurality of blocks (B11, B12 B13, B14, . . . ), and image data is encoded for each of the blocks. That is, an image similar to that in a target block is extracted from the image in the preceding frame, and the difference between the extracted image and the image in the target block is obtained for each of the blocks. In this way, differential image data from which redundancy is removed can be obtained. Also the motion vector data of the target block is obtained at this time. Then, data to be transmitted is compressed by encoding the differential image data and the motion vector data for each of the blocks.

When the motion vector data of a certain block (a target block to be encoded) is encoded, a predicted value of the motion vector (hereinafter referred to as a predictive vector) of the target block to be encoded is first obtained based on motion vectors of blocks adjacent to the target block. Here, blocks which have already been encoded are selected as the adjacent blocks used for this prediction. Normally, the encoding process is started from the block at the upper left corner, and is performed for each block in each line as shown in FIG. 1. When a certain block is encoded in this case, the encoding process has already been performed for the blocks in the line above this block and the block at the left thereof. Accordingly, for example, when the motion vector of a block B22 is encoded, the motion vectors of blocks B11 through B21 can be used.

When a motion vector of a target block to be encoded is predicted with the ITU-T H.263, the block above the target block, the block at the upper right, and the block at the left are used. By way of example, when the motion vector of the block B22 shown in FIG. 1 is encoded, the motion vectors of the blocks B12, B13, and B21 are used.

After the predictive vector of the target block to be encoded is obtained, the difference vector (or a prediction error vector) between a motion vector of the target block and its predictive vector is obtained. Then, the X and Y components of the difference vector are respectively encoded by using variable-length codes. The variable-length codes are, for example, Huffman codes.

A specific example will be given by referring to FIG. 2. This figure assumes that a motion vector of a target block to be encoded is $(MV_x, MV_y)$, and respective motion vectors of adjacent blocks B1 through B3 used to obtain a predictive vector of the target block are respectively $(PMV1_x, PMV1_y)$, $(PMV2_x, PMV2_y)$, and $(PMV3_x, PMV3_y)$. Here, the X component of the predictive vector of the target block is obtained as a median value of $PMV1_x$, $PMV2_x$, and $PMV3_x$, while its Y component is obtained as a median value of $PMV1_y$, $PMV2_y$, and $PMV3_y$. Then, difference vector data (the X and the Y components of the difference vector) are obtained by the following equations.

difference vector data $(x) = MV_x - \text{Median}(PMV1_x, PMV2_x, PMV3_x)$ difference vector data $(y) = MV_y - \text{Median}(PMV1_y, PMV2_y, PMV3_y)$ Each of difference vector data is encoded by using the variable-length codes shown in FIG. 3. The codes shown in FIG. 3 are the ones used by the ITU-T H.263.

For these codes, a data sequence having a short data length is assigned to difference vector data whose occurrence frequency is high, while a data sequence having a long data length is assigned to difference vector data whose occurrence frequency is low. The occurrence frequencies of difference vector data are statistically obtained in advance. Since use of such codes increases the probability that motion vector data having a short data length is transmitted, an average amount of information of motion vector data in each block decreases.

As described above, in a transmission system using an encoding method such as the ITU-T H.263, etc., data relating to a motion vector is compressed by using a predictive vector and the amount of information to be transmitted becomes small, which leads to an increase of a transmission efficiency.

For the codes which are widely used by existing predictive coding, a data sequence having a short data length is assigned to small difference vector data as shown in FIG. 3. In a scene where there is little or no motion or in a scene where an image changes uniformly, the prediction accuracy of a predictive vector becomes high and the length of difference vector data becomes short. Accordingly, the amount of information of encoded motion vector data becomes small on these scenes.

A specific example will be given by referring to FIGS. 4A and 4B. FIG. 4A exemplifies motion vectors in a scene where there is little or no motion. This figure assumes that a motion vector of a target block to be encoded is (1, 0), and motion vectors of blocks B1 through B3, which are adjacent to the target block, are respectively (0, 0), (0, 0), and (1, 0). In this case, the X and the Y components of the predictive vector of the target block are respectively obtained by the following equations.

predictive vector (x)=Median (0, 0, 1)=0 predictive vector (y)=Median (0, 0, 0)=0

Accordingly, "predictive vector"=(0, 0) is obtained.

Furthermore, the difference vector of the target block to be encoded is obtained by the following equation.

$$\text{difference vector} = \text{motion vector of the target block} - \text{predictive vector}$$
$$= (1, 0) - (0, 0)$$
$$= (1, 0)$$

For "difference vector data (difference vector component)=1", "0010" is obtained as encoded motion vector data if the codes shown in FIG. 3 are used. For "difference vector data=0", "1" is obtained as the encoded motion vector data. Accordingly, the encoded motion vector data to be transmitted for the target block is 5 bits.

As described above, in the scene where there is little or no motion, the difference vector data becomes small, so that also the amount of information of encoded motion vector data to be transmitted becomes small.

FIG. 4B exemplifies motion vectors in a scene where an image changes almost uniformly across frames. This figure assumes that a motion vector of a target block to be encoded is (10, −9), and motion vectors of blocks B1 through B3, which are adjacent to the target block, are respectively (10, −10), (9, −9), and (9, −9). In this case, "difference vector=(1, 0)" is obtained. Accordingly, even in the scene where an image changes uniformly, the difference vector data becomes small, so that also the amount of information of encoded motion vector data to be transmitted becomes small.

In a scene where an image does not change uniformly across frames, however, the prediction accuracy of a predictive vector becomes low and the difference vector data becomes large. Accordingly, the amount of information of encoded motion vector data to be transmitted becomes large on such a scene. Next, a specific example will be given by referring to FIG. 5.

FIG. 5 assumes that a motion vector of a target block to be encoded is (4, 2), and motion vectors of blocks B1 through B3, which are adjacent to the target block, are respectively (−10, 4), (−10, −10), and (4, −10). In this case, a predictive vector of the target block is obtained by using the motion vectors of the adjacent blocks as follows.

predictive vector (x)=Median (−10, −10, 4)=−10 predictive vector (y)=Median (4, −10, −10)=−10

Consequently, predictive vector=(−10, −10)

The difference vector of the target block is obtained by the following equation.

$$\text{difference vector} = \text{motion vector of target block} - \text{predictive vector}$$
$$= (4, 2) - (-10, -10)$$
$$= (14, 12)$$

For "difference vector data=12", "00000001000" is obtained as the motion vector data to be transmitted if the codes shown in FIG. 3 are used. Similarly, for "difference vector data=14", "000000001000" is obtained as the motion vector data to be transmitted. Accordingly, the encoded motion vector data to be transmitted for the target block is 23 bits. As described above, in the scene where an image does not change uniformly, the difference vector data becomes large, so that also the amount of information of the encoded motion vector data to be transmitted becomes large.

As described above, moving image data is compressed with predictive coding in order to increase a transmission efficiency. However, its compression ratio is not sufficiently high depending on the nature of a moving image.

SUMMARY OF THE INVENTION

An object of the present invention is to increase an encoding efficiency of a device which encodes moving image data by using predictive coding.

A motion vector encoding device according to the present invention has a configuration such that motion vectors of respective blocks obtained by partitioning each frame of moving image data are encoded. This device comprises: a predicting unit which predicts a motion vector of a target block based on motion vectors of a plurality of blocks which are adjacent to the target block; a determining unit which determines (or detects) the accuracy of a prediction made by the predicting unit based on the degrees of non-uniformity of the plurality of motion vectors; and an encoding unit which encodes the motion vector of the target block by using the result of the prediction made by the predicting unit with an encoding method determined based on the result of the determination made by the determining unit.

In the above described configuration, a predicted value of a motion vector is used when the motion vector is encoded. This predicted value is generated based on the motion vectors of a plurality of blocks which are adjacent to the target block. Here, if the motion vectors of the blocks adjacent to the target block are not uniform, that is, different one another, the accuracy of the prediction made by the predicting unit is expected to deteriorate. Accordingly, the encoding unit selects a suitable encoding method depending on prediction accuracy.

With the above described configuration, a motion vector is encoded with an encoding method optimum for the nature of moving image, thereby decreasing the amount of information and increasing an encoding efficiency.

A motion vector decoding device according to the present invention decodes the motion vector data encoded by the motion vector encoding device having the above described configuration. The configuration and the operations of the motion vector decoding device according to the present invention are fundamentally the same as those of the above described motion vector encoding device.

BRIEF DESCRIPTION OF THE DRAWINGS

FIG. 3 exemplifies variable-length codes;

FIG. 7 is a block diagram showing the configuration of an interframe predictive coding device;

FIG. 9 is a block diagram showing the configuration of the motion vector encoding device according to the preferred embodiment of the present invention;

FIG. 11 exemplifies variable-length codes;

FIG. 12 explains the operations of a first determining unit;

FIG. 13 explains the operations of a second determining unit;

FIG. 14 is a flowchart showing the process performed by the motion vector encoding device;

DESCRIPTION OF THE PREFERRED EMBODIMENTS

Figure 1:
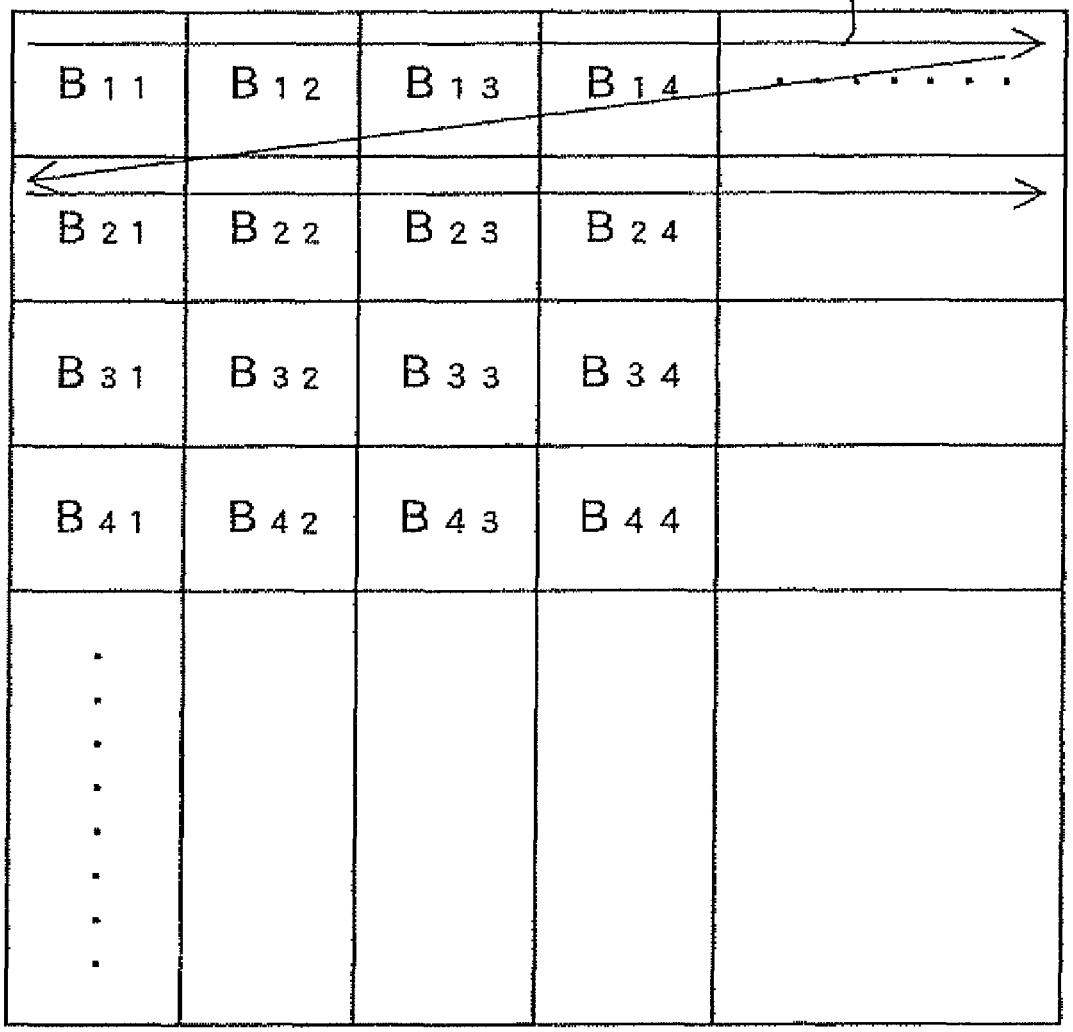
FIG. 1 explains a process for partitioning a frame into blocks.
Figure 6:
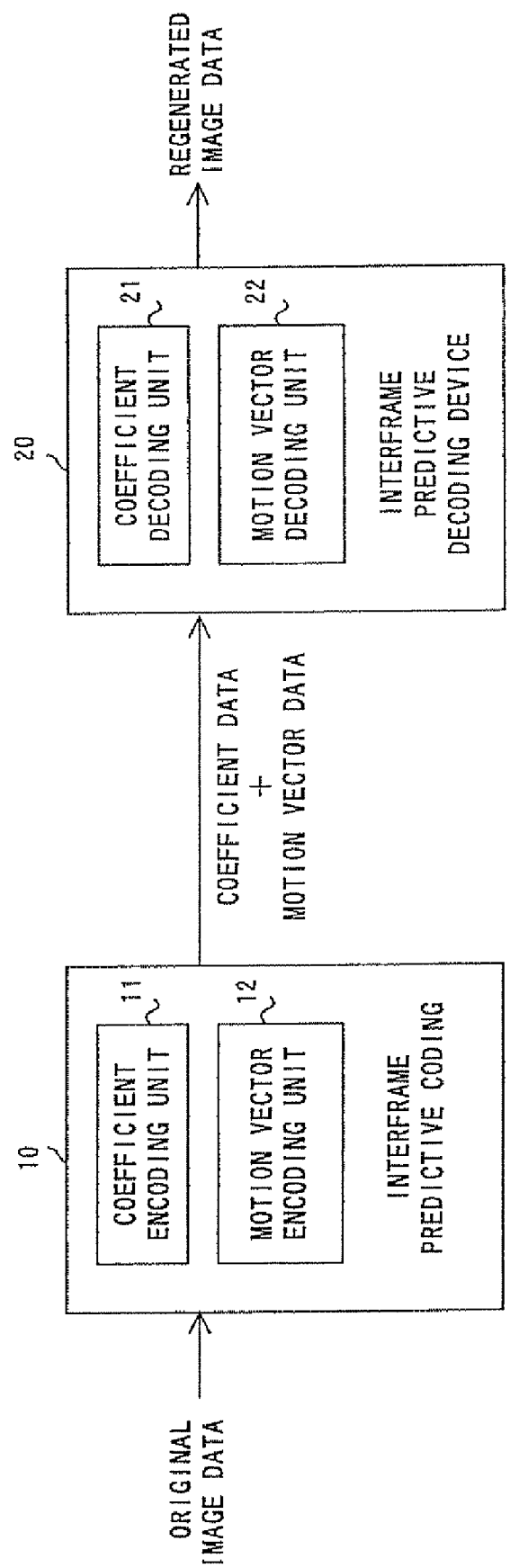
FIG. 6 exemplifies a transmission system where a motion vector encoding device and a motion vector decoding device according to the present invention are used.

A motion vector encoding device and a motion vector decoding device according to a preferred embodiment of the present invention are used, for example, in a system which transmits moving image data and is shown in FIG. 6. In this transmission system, each frame of moving image data is partitioned into a plurality of blocks as shown in FIG. 1, and each of the plurality of blocks is encoded/decoded.

An interframe predictive coding device 10 comprises a coefficient encoding unit 11 and a motion vector encoding unit 12. This device encodes and outputs original image data. Note that the interframe predictive coding device 10 does not perform interframe predictive coding for all of the frames, and, it has a capability for performing an intraframe coding depending on need.

The coefficient encoding unit 11 generates encoded coefficient data obtained by encoding coefficient information for each block. The motion vector encoding unit 12 generates encoded motion vector data obtained by encoding the information about a motion vector for each block.

An interframe predictive decoding device 20 comprises a coefficient decoding unit 21 and a motion vector decoding unit 22. This device reproduces image data based on the encoded coefficient data and the encoded motion vector data, which are generated by the interframe predictive coding device 10.

The motion vector encoding device and the motion vector decoding device according to this preferred embodiment respectively correspond to the motion vector encoding unit 12 and the motion vector decoding unit 22 in the system shown in FIG. 6.

FIG. 7 is a block diagram showing the configuration of an interframe predictive coding device. The configuration of this interframe predictive coding device is known, and is fundamentally the same as, for example, that used by a coding method such as the ITU-T H.263, etc. The motion vector encoding device according to this preferred embodiment corresponds to a vector entropy encoding circuit 41 in FIG. 7, and the capability of this circuit is different from that of an existing vector entropy encoding circuit. The configuration and the operations of the vector entropy encoding circuit 41 will be explained in detail later. Next, the operations of an existing circuit portion will be briefly explained.

When original image data is input for each frame, the interframe predictive coding device 10 performs an encoding process sequentially for a plurality of blocks obtained by partitioning each frame. An orthogonal transformation circuit 31 resolves the image data into frequency components for each block. A quantization circuit 32 quantizes the output of the orthogonal transformation circuit 31. The output of the quantization circuit 32 is sometimes referred to as "coefficient data".

An inverse quantization circuit 33, an inverse orthogonal transformation circuit 34, and a decoded image generating circuit 35 are arranged for generating the same image as that should be reproduced by the decoding device (the interframe predictive decoding device 20 in FIG. 6). The image generated by these circuits is stored in a decoded image storing circuit 36.

A motion vector calculation circuit 37 calculates a motion vector based on the image stored in the decoded image storing circuit 36 and a newly input image. A method for obtaining a motion vector for each block is a known technique. A predicted image generating circuit 38 generates a predicted image based on the image stored in the decoded image storing circuit 36 and the motion vector calculated by the motion vector calculation circuit 37. Namely, the predicted image generating circuit 38 predicts an image in a frame at the next timing from an image in a frame at certain timing, and outputs the image. This predicted image is an image generated also in the decoding device.

A prediction error signal generating circuit 39 generates a signal representing an error between an input image and a predicted image generated by the predicted image generating circuit 38. This prediction error signal is a signal to be transmitted to the decoding device. The prediction error signal is encoded and transmitted. First of all, coefficient data of the prediction error signal is obtained by the orthogonal transformation circuit 31 and the quantization circuit 32. A coefficient entropy encoding circuit 40 then encodes and outputs the coefficient data.

Note that the interframe predictive coding device 10 may sometimes perform interframe coding depending on need. In this case, not the predicted image generated by the predicted image generating circuit 38, but "0" is provided to the prediction error signal generating circuit 39.

The vector entropy encoding circuit 41 encodes motion vector data for each block. A multiplexing circuit 42 multiplexes the encoded coefficient data encoded by the coefficient entropy encoding circuit 40 and the encoded motion vector data encoded generated by the vector entropy encoding circuit 41, and outputs the multiplexed data.

As described above, the decoding device generates the same predicted image as that generated by the interframe predictive coding device 10. The decoding device then reproduces the original image by using the predicted image, the received prediction error signal, and the motion vector.

Figure 8:
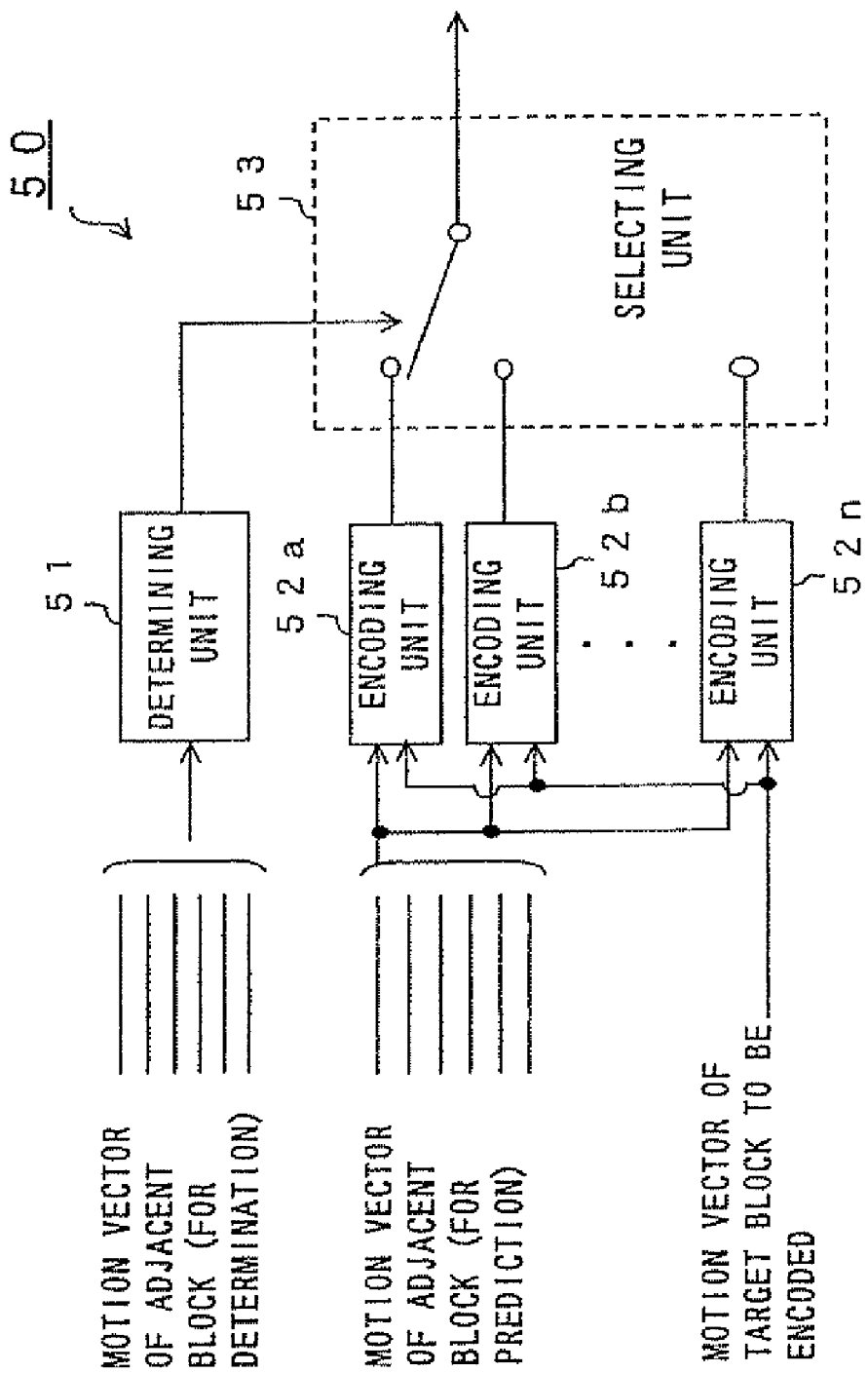
FIG. 8 shows the fundamental configuration of a motion vector encoding device according to a preferred embodiment of the present invention.

FIG. 8 shows the fundamental configuration of the motion vector encoding device according to this preferred embodiment. This encoding device corresponds to the vector entropy encoding circuit 41 in FIG. 7.

Likewise an existing encoding device, when encoding a motion vector of a target block to be encoded, the motion vector encoding device 50 according to this preferred embodiment performs: (1) the operation for generating a predictive vector of the target block from the motion vectors of blocks adjacent to the target block; (2) the operation for obtaining a difference vector between an actual motion vector of the target block and its predictive vector; and (3) the operation for generating encoded motion vector data by encoding each component of the difference vector.

The motion vector encoding device 50 comprises a determining unit 51, encoding units 52a through 52n, and a selecting unit 53. Motion vectors of some or all of the blocks within the frame to which the target block to be encoded belongs (motion vectors for determination) are provided to the determining unit 51. The determining unit 51 selects from among the provided motion vectors a plurality of motion vectors of the blocks which have been encoded and are adjacent to the target block. The determining unit 51 then estimates the prediction accuracy of a predictive vector based on the selected motion vectors. To be more specific, the determining unit 51 estimates the prediction accuracy of the predictive vector based on the degrees of "non-uniformity" or "uniformity" of the selected motion vectors.

Figure 4A:
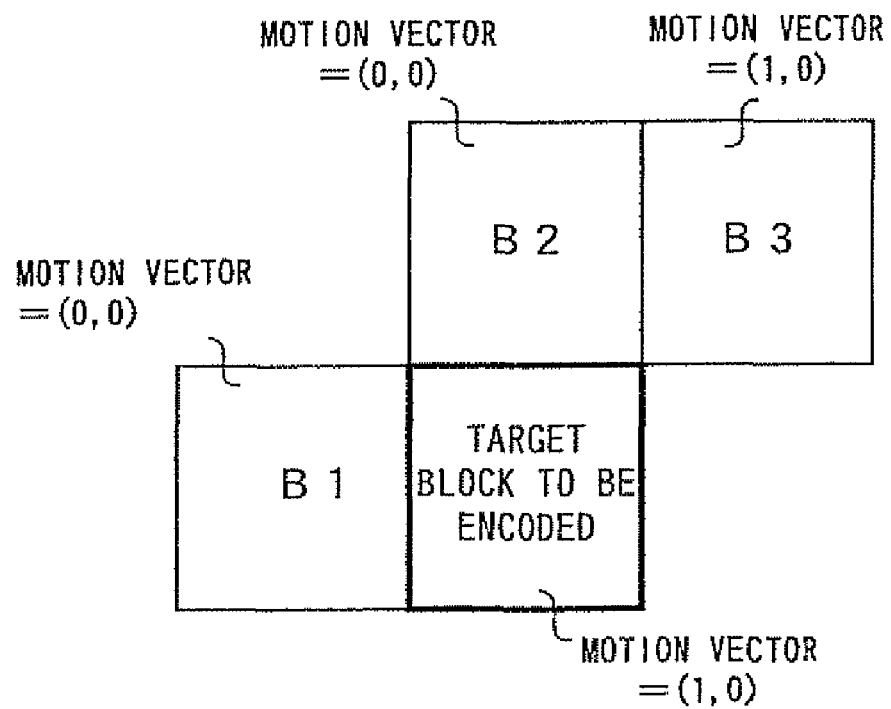
FIGS. 4A and 4B explain the method for encoding motion vectors.
Figure 4B:
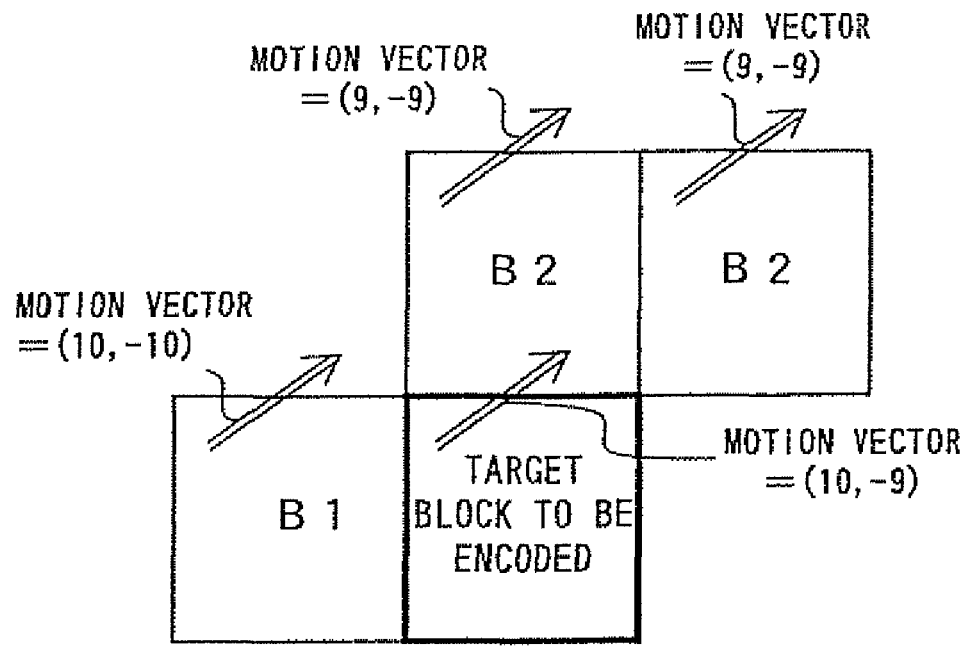

"Uniformity of a plurality of motion vectors" means that the plurality of motion vectors in a frame are the same each other. For example, on a scene where there is no motion across frames, motion vectors of all of blocks are "0 vectors" or a vector having a short length as shown in FIG. 4A. That is, the plurality of motion vectors are uniform or almost uniform. Furthermore, on a scene where an image changes almost uniformly across frames, motion vectors of respective blocks have a certain length, and their lengths and directions are almost equal each other. Namely, the plurality of motion vectors are almost uniform also in this case.

Figure 5:
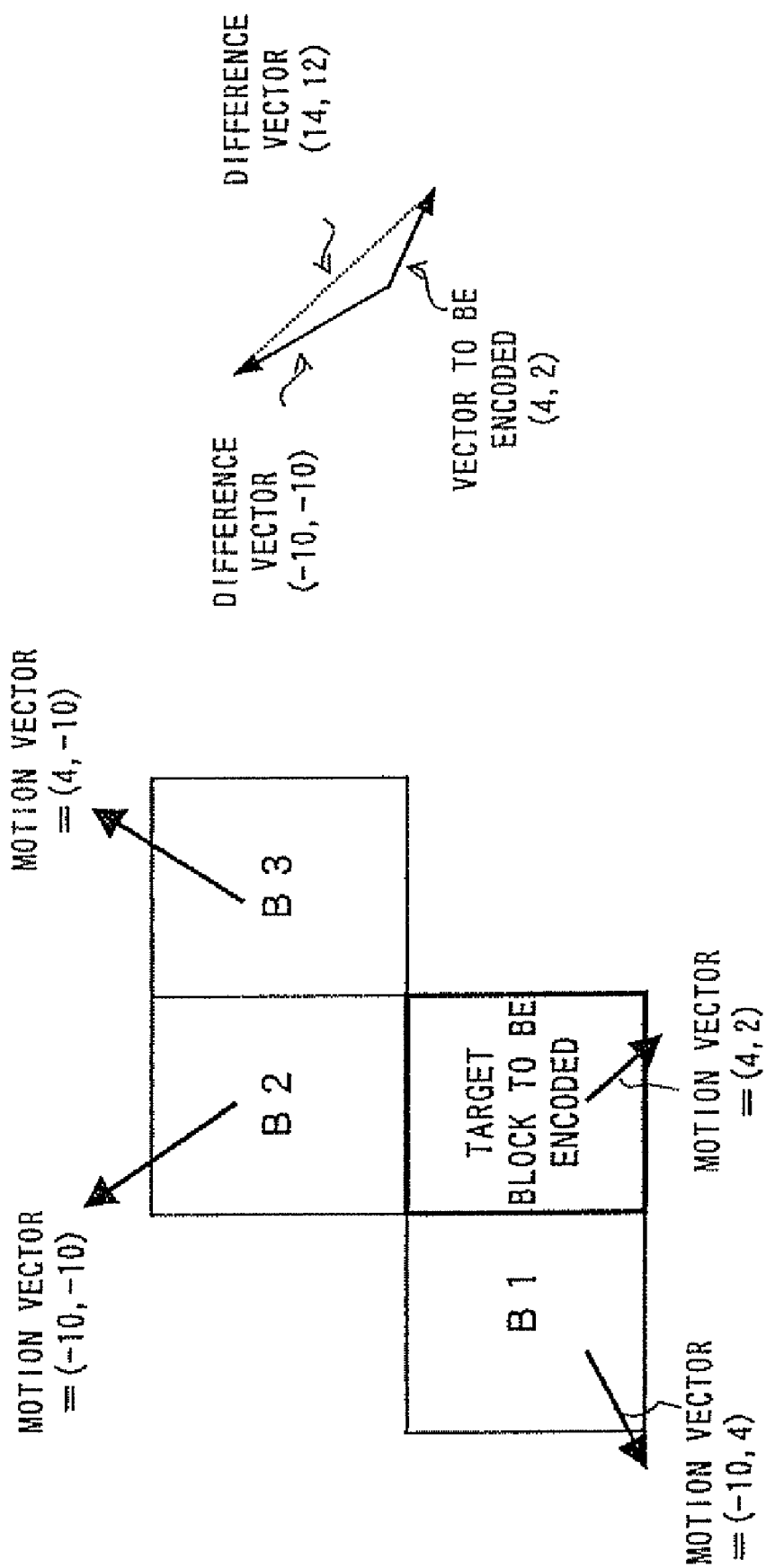
FIG. 5 explains the problems of a conventional coding.

"Non-uniformity of a plurality of motion vectors" means that the motion vectors of a plurality of adjacent blocks are different one another (not uniform). By way of example, on a scene where an image does not change uniformly across frames, the motion vectors of respective blocks are not uniform as shown in FIG. 5.

The motion vectors of the target block to be encoded and the blocks adjacent to the target block are provided to each of the encoding units 52a through 52n. At this time, the encoding units 52a through 52n may use the motion vectors of the adjacent blocks which are the same motion vectors used by the determining unit 51 when the prediction accuracy of the predictive vector is estimated, or different motion vectors.

The encoding units 52a through 52n generate a predictive vector from the plurality of motion vectors for prediction, and obtain a difference vector between the motion vector of the target block to be encoded and its predictive vector. The difference vector is a vector representing a prediction error. The respective encoding units 52a through 52n encode the respective components of the difference vector by using different codes.

The selecting unit 53 selects one of the encoding units 52a through 52n based on the prediction accuracy estimated by the determining unit 51. Specifically, the selecting unit 53 selects an encoding unit so that the amount of information of the result of encoding performed by the motion vector encoding device 50 becomes a minimum. The selecting unit 53 then outputs the result of the encoding performed by the selected encoding unit as the encoded motion vector data.

In the above described configuration, when encoding the motion vector of the target block to be encoded, the determining unit 51 estimates the prediction accuracy of the predictive vector by using the motion vectors of the blocks which have been encoded in the frame. The selecting unit 53 selects an encoding unit according to the prediction accuracy thus estimated. Namely, with this encoding device, an encoding method is determined based on the motion vectors which have been encoded in the frame, when the motion vector data of the target block to be encoded is encoded.

With such a configuration, a decoding device can recognize the encoding method selected by the encoding device without receiving the information about the encoding method. That is, if the configuration of the decoding device is made equivalent to that of the encoding device, the motion vectors used to determine the encoding method with which the target motion vector has been encoded, have already been decoded within the decoding device when the target motion vector is decoded. Accordingly, the decoding device can recognize the encoding method selected by the encoding device with the motion vectors which have already been decoded. The decoding device then decodes the received data with the decoding method corresponding to the encoding method that the decoding device itself recognizes.

If there is little or no motion, or if an image changes uniformly across frames in the above described configuration, the prediction accuracy of the predictive vector of the target block to be encoded is normally high. If the prediction accuracy is high, the possibility that the difference vector becomes small increases. If an image does not change uniformly across frames, normally, the prediction accuracy of the predictive vector becomes low, which leads to an increase in the possibility that the difference vector becomes large. This nature has been statistically analyzed. Therefore, the probability distribution of the occurrence frequency of the size of the difference vector can be estimated according to the nature of an image.

In this preferred embodiment, an encoding method is determined for each block in consideration of this nature. That is, when encoding the motion vector of the target block to be encoded, the motion vector encoding device 50 recognizes the nature of an image in an adjacent area by using the motion vectors of adjacent blocks, and selects an encoding method based on the recognition result. Accordingly, an encoding method which is optimum or suitable for the nature of the image can be selected. Here, "optimum" means that the amount of information of the encoded motion vector data obtained as an encoding result becomes a minimum.

FIG. 9 is a block diagram showing the configuration of the motion vector encoding device according to this preferred embodiment. A motion vector encoding device 60 respectively encodes the X and the Y components of a motion vector. A first determining unit 61, a prediction error generating unit 62, variable-length coding units 63a and 63b, and a first selecting unit 64 operate in order to encode the X component of the motion vector, while a second determining unit 65, a prediction error generating unit 66, variable-length coding units 67a and 67b, and a second selecting unit 68 operate in order to encode the Y component.

The configuration for encoding the X component and that for encoding the Y component may be the same. However, these configurations are different in the encoding device according to this preferred embodiment. Specifically, the capabilities of the first and the second determining units 61 and 65 are different each other.

Figure 10:
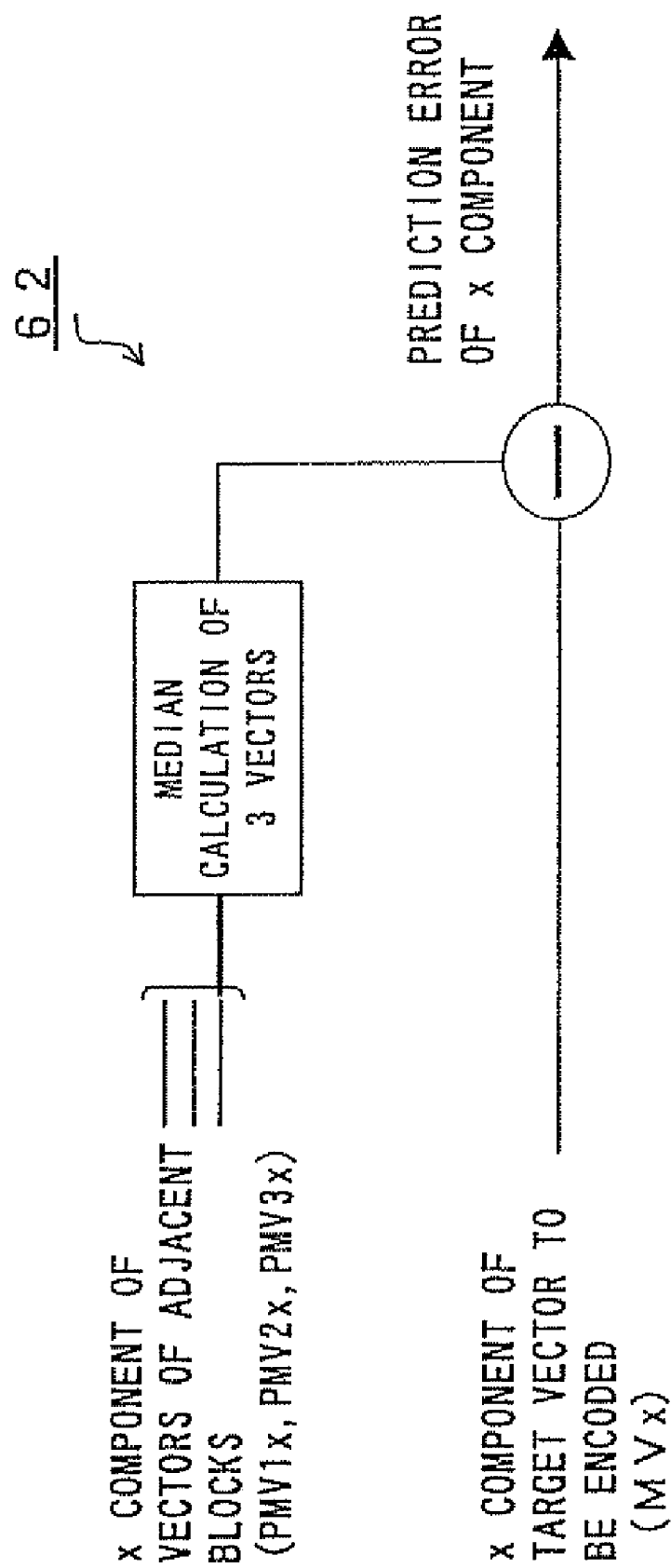
FIG. 10 explains the operations of a prediction error generating unit.

The prediction error generating unit 62 generates the X component of the difference vector as prediction error data. The method for generating a difference vector is fundamentally the same as that used by an encoding method such as the ITU-T H.263, etc. Next, the operations of the prediction error generating unit 62 will be explained by referring to FIG. 10.

The X components of the motion vectors of a target block to be encoded and a plurality of adjacent blocks are provided to the prediction error generating unit 62. The adjacent blocks used at this time are the block above the target block, the block at the upper right, and the block at the left thereof. The motion vectors of these 3 blocks have been encoded when the motion vector of the target block is encoded.

The prediction error generating unit 62 obtains a median value (that is, an intermediate value) among the provided X components of the 3 motion vectors. This median value corresponds to the X component of a predictive vector. The prediction error generating unit 62 then outputs the difference between the X component of the motion vector of the target block and its median value (the X component of the predictive vector). This difference data is a prediction error value of the X component, and corresponds to the X component of the difference vector.

In this preferred embodiment, a prediction error is generated with the same algorithm for the respective encoding methods provided by the variable-length coding units 63a and 63b. That is to say, the prediction error generating unit 62 is shared by the variable-length coding units 63a and 63b, In other words, the prediction error data generated by the prediction error generating unit 62 is provided to the variable-length coding units 63a and 63b in parallel.

The configuration of the prediction error generating unit 66 is fundamentally the same as that of the prediction error generating unit 62, and is intended to generate the prediction error data of the Y component.

The variable-length encoding units 63a and 63b encode the prediction error data that the prediction error generating unit 62 generates by using different variable-length codes. The variable-length coding unit 63a utilizes variable-length codes 1 shown in FIG. 11. The variable-length codes 1 are codes used by the ITU-T H.263, etc. A data sequence having a short data length is assigned to a small prediction error (difference value), while a data sequence having a long data length is assigned to a large prediction error. Accordingly, if the motion vectors of a plurality of adjacent blocks are uniform, the possibility that a prediction error becomes small is strong. Therefore, the data length of an encoding result becomes short if the variable-length codes 1 are used for this kind of moving image. That is, if there is little or no motion, or an image changes uniformly across frames, an average data length of an encoding result becomes short by using the variable-length codes 1, which leads to an improvement in an encoding efficiency.

The variable-length coding unit 63b utilizes the variable-length codes 2 shown in FIG. 11. Compared with the variable-length codes 1, the data length of an encoding result obtained with the variable-length codes 2 becomes longer if a prediction error is small, while the data length of an encoding result becomes short if the prediction error is large. Assuming that the prediction error is 15.5, the data length of the encoding result obtained with the variable-length codes 1 is 13 bits, while the data length of the encoding result obtained with the variable-length codes 2 is 8 bits.

Accordingly, if the motion vectors of a plurality of adjacent blocks are not uniform, the possibility that the accuracy of a predictive vector becomes low and a prediction error becomes large, is stronger. Therefore, with the variable-length codes 2, the data length of an encoding result is expected to become short for this kind of moving image. That is, if an image does not change uniformly across frames, etc., use of the variable-length codes 2 allow an average data length of an encoding result to become shorter. As a result, an encoding efficiency increases.

The variable-length coding units 63a and 63b comprise the tables which are shown in FIG. 11 and encoding patterns are registered to. These tables are generated in memory. The variable-length coding units 63a and 63b obtain a corresponding data sequence from the tables by using provided prediction error data as a key, and outputs the obtained data sequence as an encoding result.

The variable-length coding units 67a and 67b are fundamentally the same as the variable-length coding units 63a and 63b. The variable-length coding units 67a and 67b encode the prediction error data that the prediction error generating unit 66 generates by using the variable-length codes 1 and 2.

The first determining unit 61 estimates the accuracy of the predictive vector of the target block to be encoded, and generates a selection instruction to be given to the first selecting unit 64 based on the result of the estimation. Since the accuracy of the predictive vector is estimated based on the motion vectors of blocks adjacent to the target block, the accuracy depends on the nature of an image in an adjacent area.

The selection instruction generated by the first determining unit 61 is a signal for specifying either the variable-length coding unit 63a or 63b, which is expected to minimize the amount of information of an encoding result. Next, the operations of the first determining unit 61 will be explained by referring to FIG. 12.

The first determining unit 61 determines the degrees of "uniformity" or "non-uniformity" of the motion vectors of the adjacent blocks based on the motion vectors of the above described 3 adjacent blocks. Specifically, if at least one of the following conditions 1 and 2 is satisfied, the first determining unit 61 determines that the motion vectors are "not uniform". If neither of the conditions 1 and 2 is satisfied, the first determining unit 61 determines that the motion vectors are "uniform".

condition 1: $|PMV1_x-PMV2_x|$>threshold value 1 and
  $|PMV1_x-PMV3_x|$>threshold value 1 and
  $|PMV2_x-PMV3_x|$>threshold value 1
condition 2: $|PMV1_y-PMV2_y|$>threshold value 1 and
  $|PMV1_y-PMV3_y|$>threshold value 1 and
  $|PMV2_y-PMV3_y|$>threshold value 1

In the above described algorithm, the motion vectors are determined to be "not-uniform" if at least one of the X and the Y components of the motion vectors of the adjacent blocks are not uniform. Notice that the threshold value 1 is determined by conducting a simulation or an experiment.

If the first determining unit 61 determines that the motion vectors of the adjacent blocks are uniform, it recognizes that there is little or no motion or an image changes uniformly across frames in the area adjacent to the target block to be encoded, and the prediction accuracy of the predictive vector is high. The first determining unit 61 therefore instructs the first selecting unit 64 to select the result of the encoding performed by the variable-length coding unit 63a. If the first determining unit 61 determines that the motion vectors of the adjacent blocks are not uniform, it recognizes that the image does not change uniformly across frames in the area adjacent to the target block, and the prediction accuracy of the predictive vector is low. The first determining unit 61 therefore instructs the first selecting unit 64 to select the result of the encoding performed by the variable-length coding unit 63b.

Upon receipt of the instruction from the first determining unit 61, the first selecting unit 64 selects and outputs the result of the encoding performed by the variable-length coding unit 63a or 63b according to this instruction. The output of the first selecting unit 64 is the X component of encoded motion vector data.

The second determining unit 65 estimates the accuracy of the predictive vector of the target block to be encoded in a similar manner as in the first determining unit 61, and generates a selection instruction to be given to the second selecting unit 68 based on the result of the estimation. This instruction is a signal for specifying the variable-length coding unit which is expected to minimize the amount of information of the result of the encoding performed by the variable-length coding unit 67a or 67b. Note that the second determining unit 65 estimates the accuracy of the predictive vector based on criteria different from those of the first determining unit 61. Next, the operations of the second determining unit 65 will be explained by referring to FIG. 13.

To the second determining unit 65, not only the motion vectors of the above described 3 adjacent blocks but also the X component of the target motion vector to be encoded is provided. Here, the motion vector encoding device 60 is assumed to encode the Y component of the target motion vector after encoding its X component ($MV_x$).

If at least one of the following conditions 1 through 3 is satisfied, the second determining unit 65 determines that the motion vectors are "not uniform". If none of the conditions 1 through 3 are satisfied, the second determining unit 65 determines that the motion vectors are "uniform".

condition 1: $|PMV1_x - PMV2_x| >$ threshold value 1 and
$|PMV1_x - PMV3_x| >$ threshold value 1 and
$|PMV2_x - PMV3_x| >$ threshold value 1
condition 2: $|PMV1_y - PMV2_y| >$ threshold value 1 and
$|PMV1_y - PMV3_y| >$ threshold value 1 and
$|PMV2_y - PMV3_y| >$ threshold value 1
condition 3: $|MV_x - \text{Median}(PMV1_x, PMV2_x, PMV3_x)| >$ threshold value 2

In condition 3, $\text{Median}(PMV1_x, PMV2_x, PMV3_x)$ is an arithmetic operation for obtaining the X component of a predictive vector. That is, condition 3 is intended to determine whether or not the X component of the target motion vector to be encoded is far from a predicted value. The predicted value is calculated from the motion vectors of adjacent blocks. Therefore, condition 3 is used to detect that "only the target motion vector is much different from the motion vectors of the adjacent blocks in a state where the motion vectors of the adjacent blocks are uniform".

If none of the above described 3 conditions are satisfied, the second determining unit 65 instructs the second selecting unit 68 to select the result of the encoding performed by the variable-length coding unit 67a. If at least one of the conditions 1 through 3 is satisfied, the second determining unit 65 instructs the second selecting unit 68 to select the result of the encoding performed by the variable-length coding unit 67b.

Upon receipt of the instruction from the second determining unit 65, the second selecting unit 68 selects the result of the encoding performed by the variable-length coding unit 67a or 67b according to the instruction, and outputs the selected result in a similar manner as in the first selecting unit 64. The output of the second selecting unit 68 is the Y component of encoded motion vector data.

As described above, the adoption of the third condition enables the second determining unit 65 to estimate the possibility that a prediction error becomes large, with higher accuracy than that of the first determining unit 61. Consequently, the possibility that an optimum encoding method can be selected becomes strong in the second determining unit 65, so that an encoding efficiency further increases.

FIG. 14 is a flowchart showing the operations performed by the motion vector encoding device 60. The process of this flowchart is performed each time one motion vector is encoded.

Steps S1 through S5 are the operations for encoding the X component. In step S1, a method for encoding the X component of a target vector is determined based on the vectors which have already been encoded. This operation is performed by the first determining unit 61.

Steps S2 through S4 are the operations for encoding the X component of the target vector with encoding methods 1 through N. To be specific, a prediction error is calculated, and it is encoded with the encoding methods 1 through N, respectively. These operations are performed by the prediction error generating unit 62 and the variable-length coding units 63a and 63b.

In step S5, the encoding result obtained with the encoding method which is determined in step S1 is selected from among the encoding results generated in steps S2 through S4, and the selected result is output. This operation is performed by the first selecting unit 64.

Steps S6 through S10 are the operations for encoding the Y component. In step S6, a method for encoding the Y component of the target vector is determined based on the vectors which have already been encoded and the X component of the target vector. This operation is performed by the second determining unit 65.

Steps S7 through S9 are fundamentally the same as steps S2 through S4. The Y component of the target vector is encoded with the respective encoding methods 1 through N. Specifically, a prediction error is calculated, and it is encoded with the encoding methods 1 through N, respectively. These operations are performed by the prediction error generating unit 66 and the variable-length coding units 67a and 67b.

Step S10 is fundamentally the same as step S5. In this step, the encoding result obtained with the encoding method which is determined in step S6 is selected from among the encoding results generated in steps S7 through S9, and the selected result is output. This operation is performed by the second selecting unit 68.

The respective units 61 through 68 within the motion vector encoding device 60, which are shown in FIG. 9, may be implemented by software or hardware. If they are implemented by software, the motion vector encoding device 60 comprises at least a CPU and a memory, and offers the capabilities explained by referring to FIGS. 9 through 13 by making the CPU execute the program describing the process of the flowchart shown in FIG. 14.

Described next is a device for decoding the motion vector which is encoded by the motion vector encoding device having the above described configuration.

Figure 15:
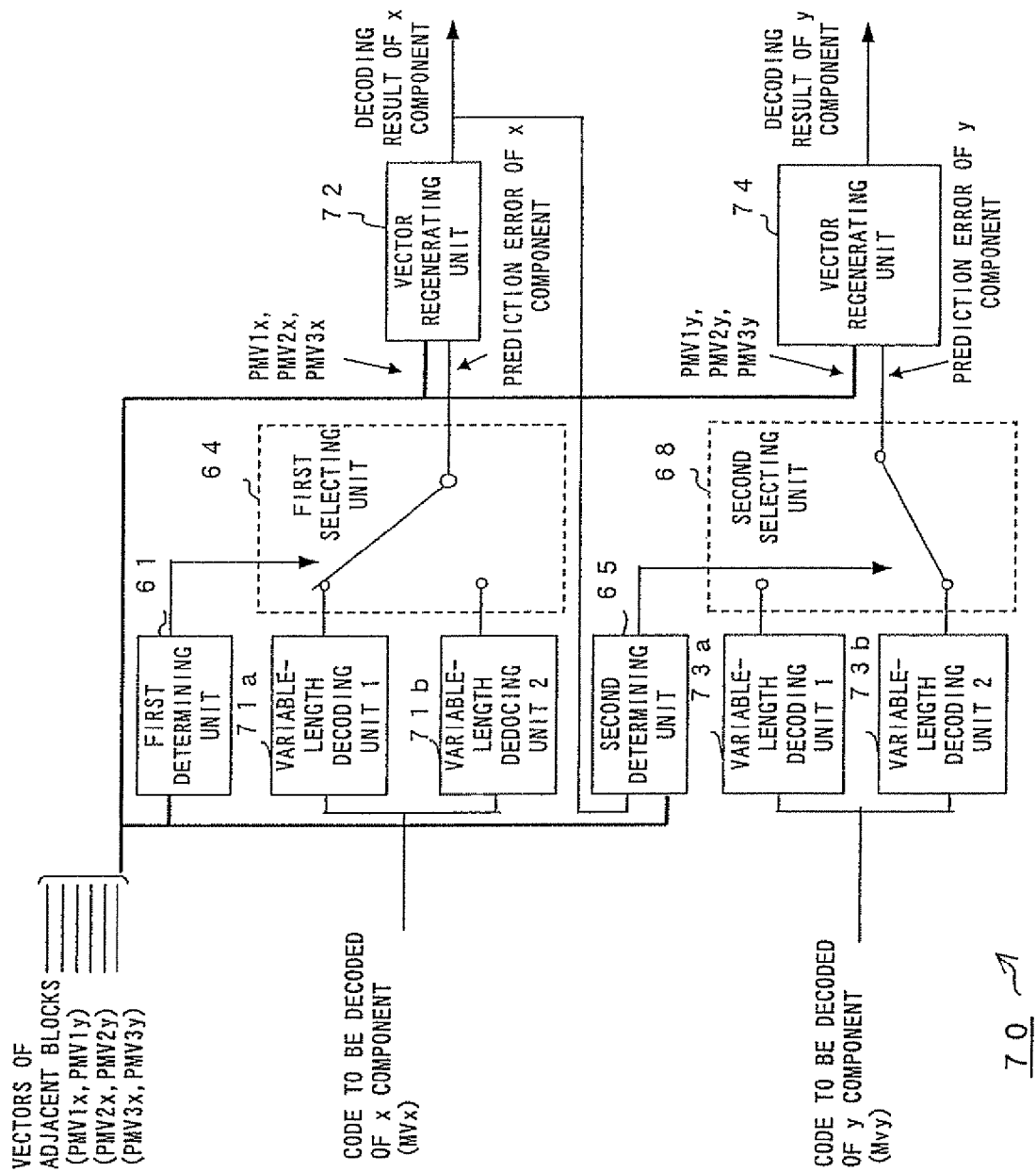
FIG. 15 is a block diagram exemplifying a motion vector decoding device according to a preferred embodiment of the present invention.

FIG. 15 is a block diagram showing the configuration of a motion vector decoding device according to a preferred embodiment. A motion vector decoding device 70 comprises a first determining unit 61, a first selecting unit 64, a second determining unit 65, and a second selecting unit 68. These units 61, 64, 65, and 68 are the same as those arranged within the motion vector encoding device 60. Variable-length decoding units 71a, 71b, 73a, and 73b perform decoding processes corresponding to the variable-length coding units 63a, 63b, 67a, and 67b. That is, the variable-length decoding units 71a and 73a decode encoded motion vector data by using the variable-length codes 1, while the variable-length decoding units 71b and 73b decode encoded motion vector data by using the variable-length codes 2.

Figure 2:
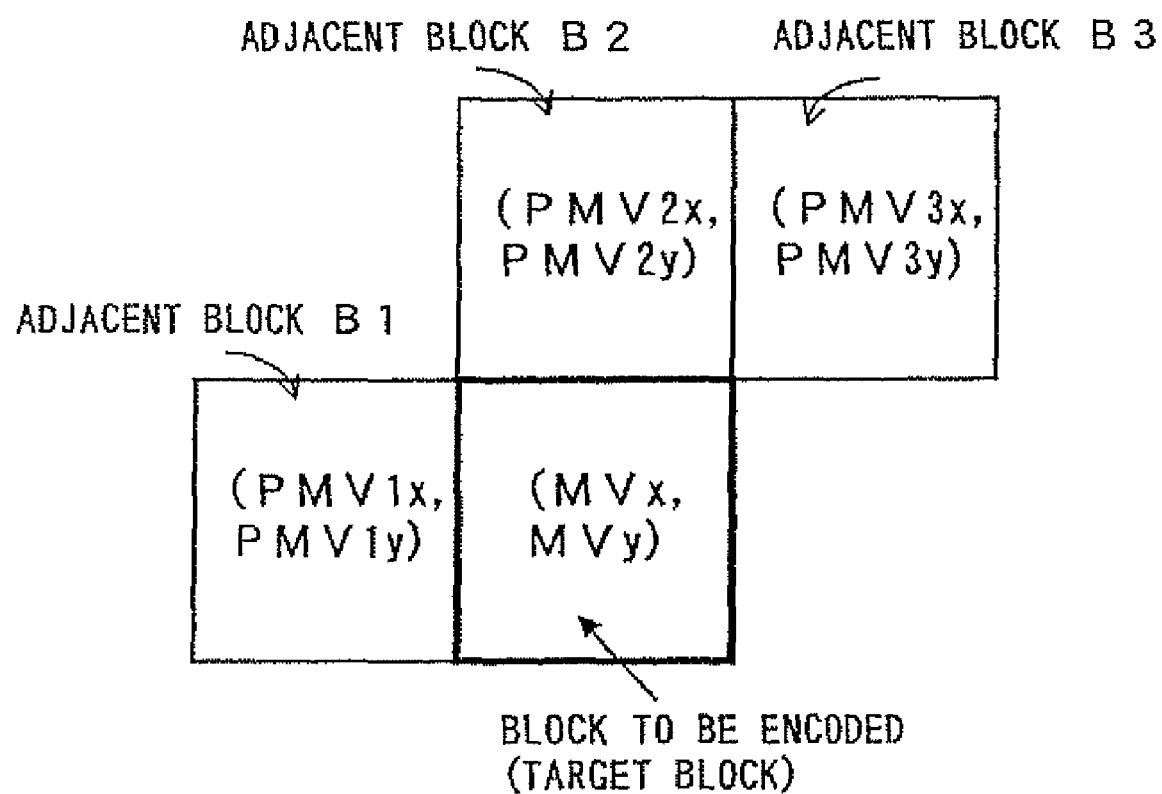
FIG. 2 exemplifies a prediction of a motion vector.

The motion vector decoding device 70 decodes encoded motion vector data for each block in the same order as the encoding order of the motion vector encoding device 60. In other words, the motion vector decoding device 70 regenerates the motion vectors from the encoded motion vector data for the respective blocks in the order shown in FIG. 1. Since the motion vector encoding device 60 encodes a target vector by using the vectors which have been encoded prior to the target vector, the vectors used for encoding the target vector have already been decoded when the motion vector decoding device 70 decodes the target vector. For example, when the motion vector of the target block shown in FIG. 2 is decoded, all of the motion vectors of the adjacent blocks B1 through B3 have been decoded by the motion vector decoding device 70. Accordingly, in this case, the motion vector decoding device 70 can use the motion vectors of the adjacent blocks B1 through B3 when decoding the target motion vector.

In the above described configuration, the first determining unit 61 determines the decoding method based on the motion vectors of the 3 adjacent blocks. The 3 motion vectors used at this time are regenerated from the encoded motion vector data that the motion vector decoding device 70 receives. Namely, the first determining unit 61 can recognize the encoding method without receiving additional information indicating the encoding method from the motion vector encoding device 60.

The variable-length decoding units 71 and 71b respectively regenerate prediction errors from the encoded motion vector data received from the motion vector encoding device 60. The first selecting unit 64 selects the result of the decoding performed by the variable-length decoding unit 71a or 71b according to the instruction from the first determining unit 61, and outputs the selected result. The output of the first selecting unit 64 is a prediction error of the X component.

Figure 16:
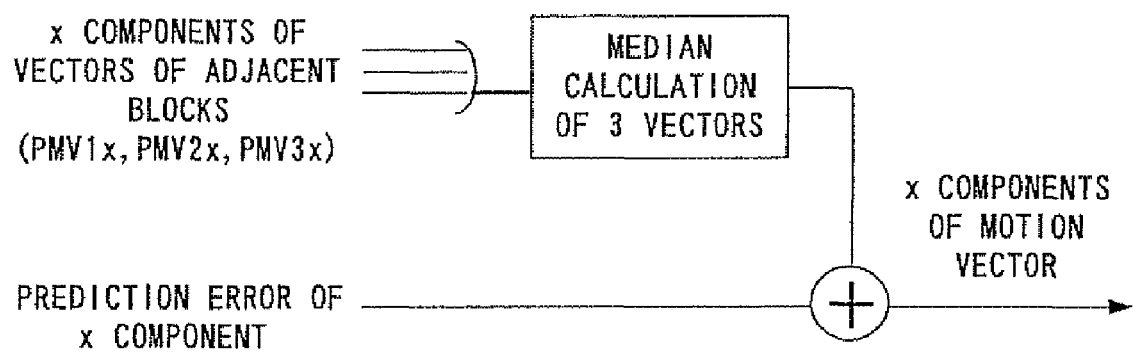
FIG. 16 explains the operations of a vector regenerating unit.

As shown in FIG. 16, the vector regenerating unit 72 is provided the respective X components of the motion vectors of the adjacent blocks, and outputs their median value. The median value is the X component of a predictive vector. The vector regenerating unit 72 then regenerates the X component of the motion vector of the target block by adding a prediction error, which is the output of the first selecting unit 64, to the X component of the predictive vector.

The operations for regenerating the Y component of the motion vector of the target block are fundamentally the same as those for regenerating the X component. Remember that, however, the second determining unit 65 utilizes not only the motion vectors of adjacent blocks but also the X component of the motion vector of the target block, which is regenerated by the vector regenerating unit 72, in order to determine the decoding method. This utilization is the same as that explained by referring to FIG. 13.

As described above, a motion vector of a target block is encoded with an encoding method determined based on the motion vectors of blocks adjacent to the target block, according to this preferred embodiment. Furthermore, the encoded motion vector data of the target block is decoded with the decoding method determined based on the motion vectors of the blocks adjacent to the target block. Accordingly, an optimum code can be used in correspondence with a local nature of moving image, so that an encoding efficiency increases.

In the above described preferred embodiment, an encoding method is determined by using the motion vectors of the 3 adjacent blocks. The present invention, however, is not limited to this configuration. The present invention is also applicable to the configuration where motion vectors of a plurality of adjacent blocks are used.

Furthermore, the above described preferred embodiment assumes a system which transmits image data. The present invention, however, is not limited to this configuration. For example, the present invention is also applicable to a device which stores image data.

According to the present invention, a target vector is encoded with an optimum encoding method which is determined based on a plurality of motion vectors which have already been encoded in an area adjacent to the target motion vector, thereby reducing the amount of information of an encoding result. Furthermore, when the data thus encoded is decoded, the decoding method corresponding to the encoding method can be recognized without requiring the additional information indicating the encoding method.

What is claimed is:

1. A motion vector decoding device for use with motion vectors having been obtained by partitioning frames of moving image data, comprising:
    predicting means for predicting an encoded motion vector of a target block based on decoded motion vectors of a plurality of blocks adjacent to the target block, to thereby provide a prediction result;
    determining means for determining accuracy of the prediction result based on degrees of non-uniformity of decoded motion vectors of a plurality of blocks adjacent to the target block, to thereby provide a determination result; and
    decoding means for decoding the encoded motion vector of the target block using the prediction result with a decoding method selected from at least two different decoding methods based on the determination result.

2. A motion vector decoding method for use with motion vectors having been obtained by partitioning frames of moving image data, comprising:
    predicting, by a motion vector decoding device, an encoded motion vector of a target block based on decoded motion vectors of a plurality of blocks adjacent to the target block, to thereby provide a prediction result;
    determining, by the motion vector decoding device, accuracy of the prediction result based on degrees of non-uniformity of decoded motion vectors of a plurality of blocks adjacent to the target block, to thereby provide a determination result; and
    decoding, by the motion vector decoding device, the encoded motion vector of the target block using the prediction result with a decoding method selected from at least two different decoding methods based on the determination result.

3. A motion vector decoding method for use with motion vectors having been obtained by partitioning frames of moving image data, comprising:
    predicting, by a motion vector decoding device, an encoded motion vector of a target block based on decoded motion vectors of a plurality of blocks adjacent to the target block, to thereby provide a prediction result;
    determining, by the motion vector decoding device, accuracy of the prediction result based on degrees of non-uniformity of decoded motion vectors of a plurality of blocks adjacent to the target block, to thereby provide a determination result; and
    decoding, by the motion vector decoding device, the encoded motion vector of the target block with a decoding method selected from at least two different decoding methods based on the determination result.

4. A motion vector decoding method as in claim 3, wherein the selected decoding method uses the prediction result to decode the encoded motion vector of the target block.

5. A motion vector decoding method as in claim 3, wherein at least one of the decoding methods use the prediction result to decode.

* * * * *